US012659269B2

(12) United States Patent
Basu et al.

(10) Patent No.: US 12,659,269 B2
(45) Date of Patent: Jun. 16, 2026

(54) MULTIPATH NETWORK TRAFFIC DISTRIBUTION METHODS FOR REDUCED DETECTABILITY

(71) Applicant: Raytheon BBN Technologies Corp., Cambridge, MA (US)

(72) Inventors: Prithwish Basu, Westford, MA (US); George Stephen Zabele, North Reading, MA (US); Gregory S. Lauer, Falmouth, MA (US); Christophe Jean-Claude Merlin, Wakefield, MA (US)

(73) Assignee: RTX BBN TECHNOLOGIES, INC., Cambridge, MA (US)

( * ) Notice: Subject to any disclaimer, the term of this patent is extended or adjusted under 35 U.S.C. 154(b) by 541 days.

(21) Appl. No.: 18/108,937

(22) Filed: Feb. 13, 2023

(65) Prior Publication Data

US 2023/0261983 A1     Aug. 17, 2023

Related U.S. Application Data

(60) Provisional application No. 63/309,329, filed on Feb. 11, 2022.

(51) Int. Cl.
*H04L 12/66*          (2006.01)
*H04L 45/00*          (2022.01)
(Continued)

(52) U.S. Cl.
CPC ............ *H04L 45/38* (2013.01); *H04L 47/125* (2013.01); *H04L 47/2441* (2013.01)

(58) Field of Classification Search
CPC ..... H04L 1/0002; H04L 1/0041; H04L 67/12; H04L 1/1854; H04L 12/66; H04L 47/122;
(Continued)

(56) References Cited

U.S. PATENT DOCUMENTS

| | | | |
|---|---|---|---|
| 6,775,258 B1 * | 8/2004 | van Valkenburg ...... | H04L 67/04 |
| | | | 455/507 |
| 8,160,056 B2 * | 4/2012 | Van Der Merwe ..... | H04L 45/04 |
| | | | 709/239 |

(Continued)

OTHER PUBLICATIONS

International Preliminary Report on Patentability; International Application No. PCT/US2023/012813; mailed Aug. 22, 2024; 7 pages.
(Continued)

*Primary Examiner* — Kharye Pope
(74) *Attorney, Agent, or Firm* — CANTOR COLBURN LLP

(57)          ABSTRACT

A method of sending a flow of a plurality of data packets across a data network from a source node to a destination node is provided, the data network including a plurality of links between nodes. The method includes: (a) determining a set of weights, the weights corresponding to respective links of the plurality of links, such that obeying the set of weights during data transmission tends to minimize side channel leakage for the flow; and (b) routing packets of the flow along the plurality of links of the data network according to their respective weights. A corresponding apparatus, system, and computer program product are also provided.

20 Claims, 6 Drawing Sheets

(51) Int. Cl.
    *H04L 47/125*     (2022.01)
    *H04L 47/2441*     (2022.01)

(58) Field of Classification Search
    CPC ....... H04L 69/00; H04L 67/60; H04B 17/309;
                 H04B 17/318; H04W 52/265; H04W
                               52/241; H04W 24/02
    See application file for complete search history.

(56) References Cited

U.S. PATENT DOCUMENTS

| | | | |
|---|---|---|---|
| 2004/0190447 A1* | 9/2004 | Dacosta .............. | H04W 52/267 |
| | | | 370/351 |
| 2004/0264372 A1* | 12/2004 | Huang .................. | H04W 40/02 |
| | | | 370/310 |
| 2012/0057456 A1* | 3/2012 | Bogatin .................. | H04W 4/80 |
| | | | 370/230.1 |
| 2018/0262327 A1* | 9/2018 | Jain ................... | H04L 12/40013 |
| 2020/0100117 A1* | 3/2020 | Hassan Hussein .. | H04B 17/354 |
| 2020/0359159 A1* | 11/2020 | Krzych ................. | G01S 5/0294 |
| 2023/0224942 A1* | 7/2023 | Abotabl .................... | H04L 5/14 |
| | | | 370/278 |

OTHER PUBLICATIONS

International Search Report and Written Opinion; International Application No. PCT/US2023/012813; International Filing Date Feb. 10, 2023; 7 Pages, Mailing Date May 2, 2023.

Draper-Gil, et al., "Characterization of Encrypted and VPN Traffic using Time-related Features", International Conference on Information Systems Security and Privacy (ICISSP 2016), pp. 407-414.

Fortz, et al., "Internet traffic engineering by optimizing OSPF weights", Proceedings IEEE Infocom, pp. 519-528, Tel Aviv, Israel, 2000.

Gallager, "A Minimum Delay Routing Algorithm Using Distributed Computation", IEEE Transactions on Communications, vol. 25, No. 1, pp. 73-85, Jan. 1977.

GEneric COnstraint Development Environment. https://www.gecode.org/.

Han, et al., "Multi-path TCP: a joint congestion control and routing scheme to exploit path diversity in the internet", EEE/ACM Transactions on Networking (TON), vol. 14 , Issue 6, pp. 1260-1271, Dec. 2006.

Hopps, "Analysis of an Equal-Cost Multi-Path Algorithm", RFC 2992 (Informational), Nov. 2000, URL: https://tools.ietf.org/html/rfc2992.

Javed, et al., "Multipath protocol for delay-sensitive traffic", IEEE COMSNETS, 2009.

"Layer 3 VPN Load Balancing Overview," Juniper Networks, 2017. URL: https://www.juniper.net/documentation/en_US/release-independent/nce/topics/concept/layer-3-vpn-load-balancing-with-ip-header-filtering-overview.html.

Kadloor, et al., "Scheduling with privacy constraints," 2012 IEEE Information Theory Workshop, 2012, pp. 40-44.

Kleinberg, "Approximation Algorithms for Disjoint Paths Problems", PhD thesis, Massachusetts Institute of Technology, 1996.

Kozlov, et al., "The Polynomial Solvability of Convex Quadratic Programming", U.S.S.R. Comput. Maths. Math. Physics, 1981, pp. 223-228, vol. 20, No. 5, Pergamon Press Ltd., Great Britain.

C. Liu, et al., "Cologne: a declarative distributed constraint optimization platform", Proc. VLDB Endowment, Apr. 2012, pp. 752-763, vol. 5, No. 8.

Q. Liu, et al., "On the min-max-delay problem: NP-completeness, algorithm, and integrality gap", IEEE Information Theory Workshop (ITW), Kaohsiung, 2017.

Merlin, et al., "Latency-Aware Forwarding for IRON: Latency Support for Back-Pressure Forwarding", IEEE Milcom 2018, pp. 474-479, Los Angeles, CA.

Mirhakkak, et al., "Modeling and Simulation of Haipe", MILCOM 2006—2006 IEEE Military Communications conference, 2006.

Neely, et al., "Optimal Backpressure Routing in Wireless Networks with Multi-Receiver Diversity", Ad Hoc Networks, 2009, pp. 862-881, vol. 7, No. 5, Elsevier.

"Network Functions Virtualization—Introductory White Paper", ETSI., Oct. 2012, accessed from <https://portal.etsi.org/NFV/NFV_White_Paper.pdf>.

Oliveira, et al., "Coding for Trusted Storage in Untrusted Networks", IEEE Transactions on Information Forensics and Security, Dec. 2012, pp. 1890-1899, vol. 7, No. 6.

Stellato, et al., "OSQP: An Operator Splitting Solver for Quadratic Programs.".

Perlman, "Routing with Byzantine Robustness", Sun Microsystems Technical Report, Sep. 2005, Menlo Park, CA.

Ristenpart, et al., "Hey, you, get off of my cloud: exploring information leakage in third-party compute clouds", ACM CCS, 2009.

Rosner, et al., "Profit: Detecting and Quantifying Side Channels in Networked Applications", Network and Distributed System Security (NDSS) Symposium, 2019.

Torrieri, Principles of Spread-Spectrum Communication Systems, 4th ed._abstract.

Yan, et al., "Low Probability of Detection Communication: Opportunities and Challenges," in IEEE Wireless Communications, Oct. 2019, pp. 19-25, vol. 26, No. 5.

Zhang, et al., "Cross-Tenant Side-Channel Attacks in PaaS Clouds", ACM CCS, 2014, pp. 990-1003.

Ye et al. "Side Channel Leakage Analysis—Detection, Exploitation and Quantification" PhD Dissertation, Worcester Polytechnic Institute, Dec. 2014.

Lou et al., "Spread: Improving Network Security By Multipath Routing," IEEE Military Communications Conference, 2003. MILCOM 2003, pp. 808-813 vol. 2, Boston, MA.

Yang et al., "Improving Network Security by Multipath Traffic Dispersion", 2001 MILCOM Proceedings Communications for Network-Centric Operations: Creating the Information Force, pp. 34-38, vol. 1, IEEE, McLean, VA.

\* cited by examiner

Figure 1:
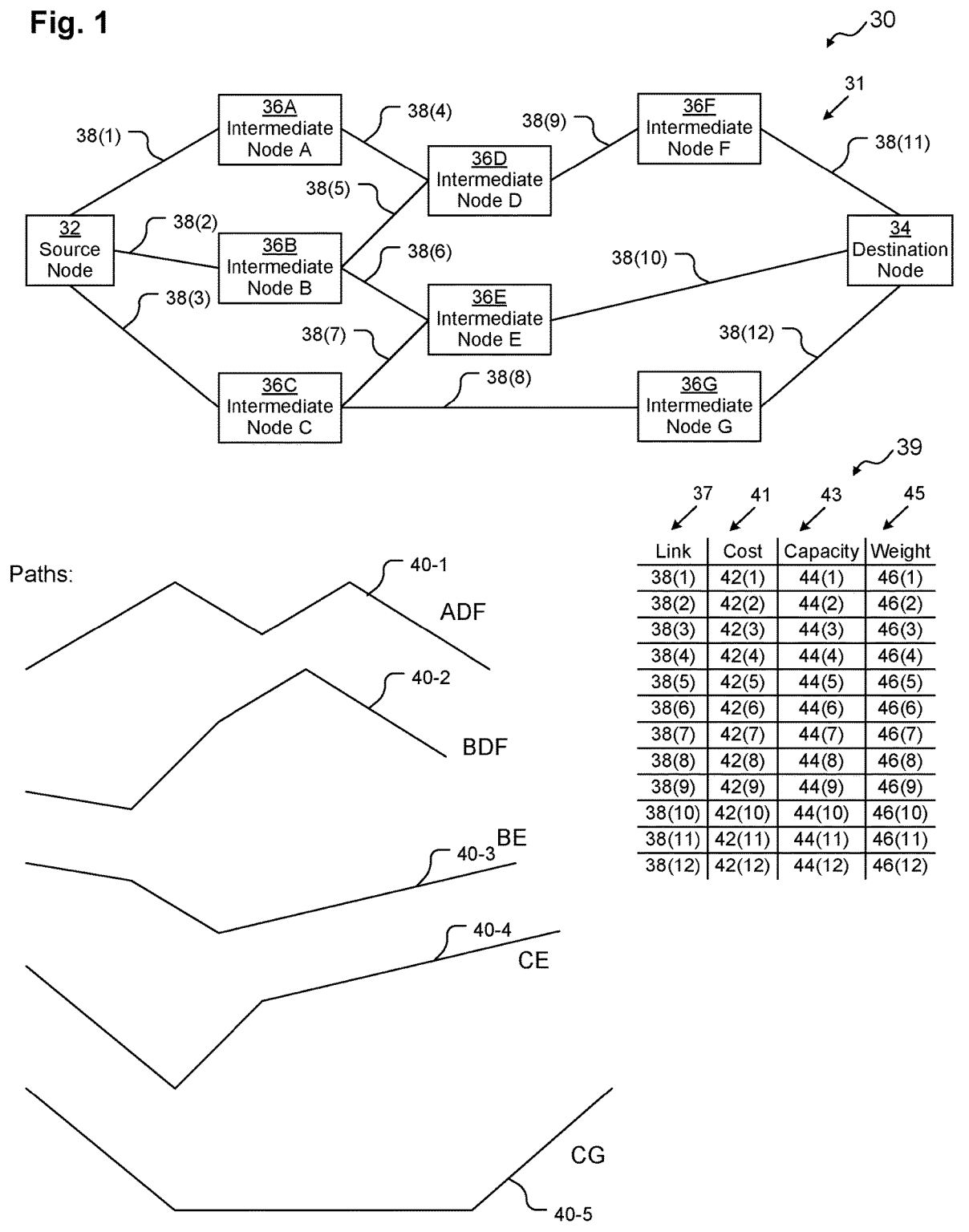

36A
Intermediate
Node A

38(4)

38(9)

36F
Intermediate
Node F

38(11)

38(5)

36D
Intermediate
Node D

32
Source
Node

38(2)

36B
Intermediate
Node B

38(6)

38(10)

34
Destination
Node

38(3)

36E
Intermediate
Node E

38(7)

36C
Intermediate
Node C

38(8)

36G
Intermediate
Node G

38(12)

39

37   41   43   45

Paths:

40-1

ADF 40-2

BDF 40-3  BE 40-4

CE 40-5

CG

| Link | Cost | Capacity | Weight |
|------|------|----------|--------|
| 38(1) | 42(1) | 44(1) | 46(1) |
| 38(2) | 42(2) | 44(2) | 46(2) |
| 38(3) | 42(3) | 44(3) | 46(3) |
| 38(4) | 42(4) | 44(4) | 46(4) |
| 38(5) | 42(5) | 44(5) | 46(5) |
| 38(6) | 42(6) | 44(6) | 46(6) |
| 38(7) | 42(7) | 44(7) | 46(7) |
| 38(8) | 42(8) | 44(8) | 46(8) |
| 38(9) | 42(9) | 44(9) | 46(9) |
| 38(10) | 42(10) | 44(10) | 46(10) |
| 38(11) | 42(11) | 44(11) | 46(11) |
| 38(12) | 42(12) | 44(12) | 46(12) |

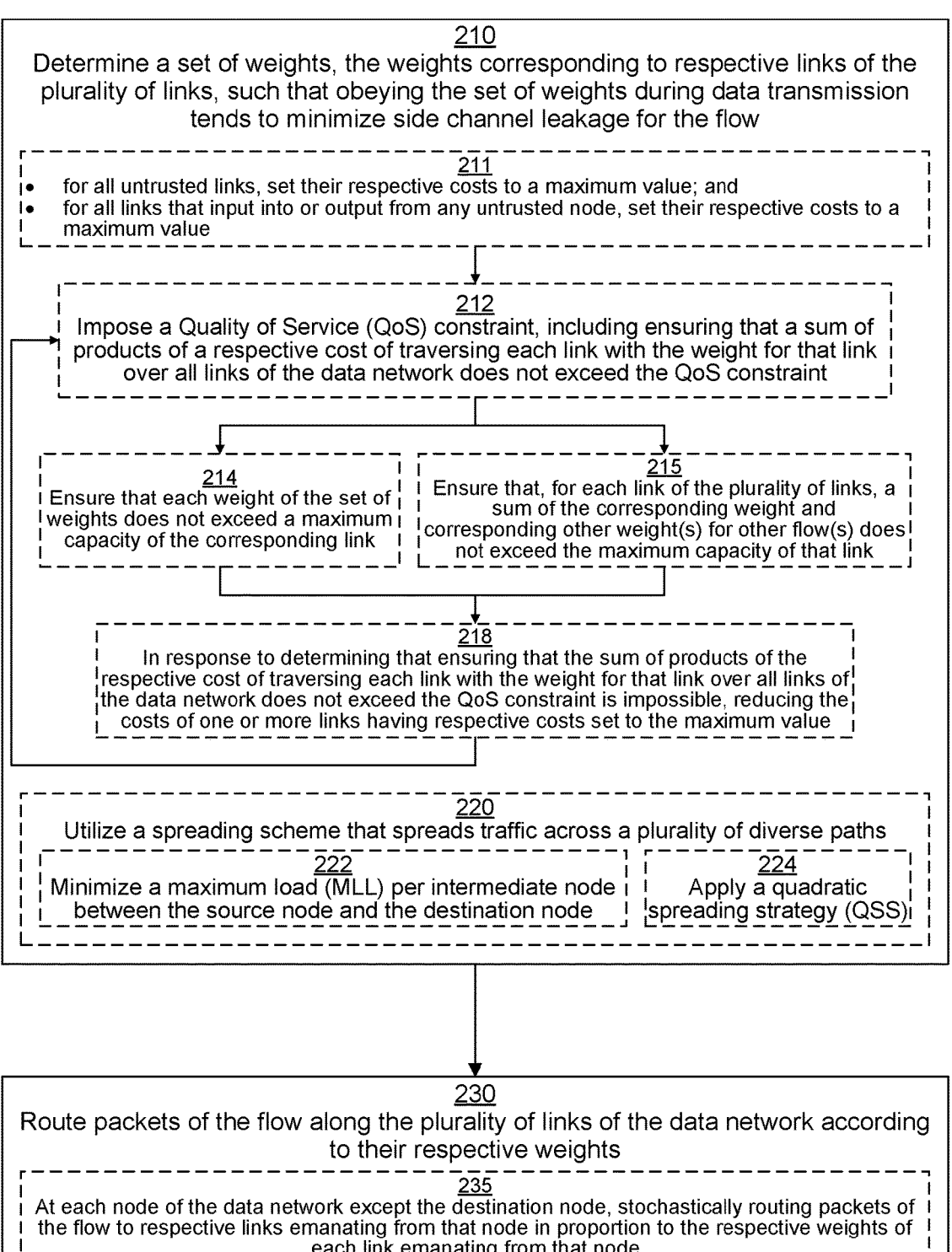

210
Determine a set of weights, the weights corresponding to respective links of the plurality of links, such that obeying the set of weights during data transmission tends to minimize side channel leakage for the flow

211
- for all untrusted links, set their respective costs to a maximum value; and
- for all links that input into or output from any untrusted node, set their respective costs to a maximum value

212
Impose a Quality of Service (QoS) constraint, including ensuring that a sum of products of a respective cost of traversing each link with the weight for that link over all links of the data network does not exceed the QoS constraint

214
Ensure that each weight of the set of weights does not exceed a maximum capacity of the corresponding link

215
Ensure that, for each link of the plurality of links, a sum of the corresponding weight and corresponding other weight(s) for other flow(s) does not exceed the maximum capacity of that link

218
In response to determining that ensuring that the sum of products of the respective cost of traversing each link with the weight for that link over all links of the data network does not exceed the QoS constraint is impossible, reducing the costs of one or more links having respective costs set to the maximum value

220
Utilize a spreading scheme that spreads traffic across a plurality of diverse paths

222
Minimize a maximum load (MLL) per intermediate node between the source node and the destination node

224
Apply a quadratic spreading strategy (QSS)

230
Route packets of the flow along the plurality of links of the data network according to their respective weights

235
At each node of the data network except the destination node, stochastically routing packets of the flow to respective links emanating from that node in proportion to the respective weights of each link emanating from that node

300

300"

MULTIPATH NETWORK TRAFFIC DISTRIBUTION METHODS FOR REDUCED DETECTABILITY

CROSS-REFERENCE TO RELATED APPLICATION

This application claims priority under 35 U.S.C. § 119(e) to U.S. Provisional Application Ser. No. 63/309,329 titled "MULTIPATH NETWORK TRAFFIC DISTRIBUTION METHODS FOR REDUCED DETECTABILITY," filed on Feb. 11, 2022, which is incorporated herein by reference in its entirety for all purposes.

BACKGROUND

A physical network can be logically partitioned into multiple application-specific virtual networks (or slices) to support multiple sets of users, one per slice. While this idea has been in use for decades in the form of virtual private networks (VPNs), the recent explosive growth of high performance cloud and edge computing, software defined networking, and the increasing need for supporting heterogeneous user-specific data traffic handling policies has led to increased popularity of network function virtualization. For example, a portion of a 5G network may include end user systems connected via Radio Access Networks, which are in turn connected via a Core Network. The latter makes heavy use of virtualized network infrastructure, e.g., most network functions such as routing, network management, billing, etc., are performed in virtual machines (VM) running on physical computational infrastructure. Such virtualization of network infrastructure enables network slicing. One conventional system uses two end-to-end virtual networks (slices)—one slice connecting a Handset with a Webserver and a second slice connecting various IoT devices, both enabled by shared infrastructure including Legacy routers and nodes running virtualized network functions in virtual machines. The physical hardware hosting components of the network slices may be owned and operated by different parties, some trustworthy and some not. Network function virtualization exposes slice users to potential adversarial attacks. An adversary can own the hardware (routers or computational nodes for running virtual machines), or can compromise it. Even if an adversary cannot control the node itself, it can execute malicious VMs on common physical nodes shared by the victim. On untrustworthy or compromised nodes, we assume that an adversary can run an arbitrary VM, can inspect all traffic (with associated metadata) being sent to/from other VMs on that hardware, and can query the operating system to determine which VM is running at any given time and what resources it is using. This exposes a slice passing through that hardware to passive side channel attacks—the adversary observes the users' encrypted data streams and gleans sensitive information from them by performing traffic analysis on the packet size and inter-packet time distributions to force information leakage. Side channels exist even if the adversary does not have control over the hardware equipment but instead manages to run a VM on the same physical machine as the victim, e.g., using timing information from cache misses experienced by a malicious VM, it can glean load characteristics of a co-resident victim VM.

Since the adversary does not leave behind any observable signature of carrying out a passive side channel attack, it is difficult to detect such activity and then route around it. Typical countermeasures to avoid observability and timing-based side channel attacks include tunneling, padding, and time-spacing of the data packets.

SUMMARY

Unfortunately, conventional countermeasures to avoid observability and timing-based side channel attacks, such as tunneling, padding, and time-spacing of the data packets, suffer from deficiencies. The primary assumption for these conventional techniques is that data is sent along a single path from a source to a destination. This is not ideal from the perspective of reducing side channel leakage since all of the signal buried in encrypted packet streams' metadata is still observable by any adversary on the path. The signal is indeed obscured by the application of the countermeasures, but since large performance penalties (e.g., loss of throughput and higher delay) cannot be tolerated, the padding or time-spacing cannot be done at large rates that may be needed to fool the adversary. Hence, the adversary still has a lot of room to conduct side channel attacks.

Thus, it would be desirable to implement a defense against side channel attacks that does not suffer from these deficiencies. This may be accomplished by utilizing a network spread spectrum approach by dividing a flow of packets into several sub-flows, diffusing the flow across many different paths across a network. Since it is unlikely that an adversary has control over a node or connection in every path, an adversary will lack access to metadata about the entire flow, drastically reducing the adversary's ability to derive useful information via side channel leakage. Packets may be stochastically divided between different paths in order to spread out the flow as much as possible. Furthermore, a Quality of Service (QoS) constraint may be imposed to limit any potential performance penalty. In some embodiments, a Minimize Maximum Load (MML) strategy may be employed to minimize the maximum load at any given node where an adversary could be potentially situated. In other embodiments, a Quadratic Spreading Strategy (QSS) may be employed using QoS-constrained quadratic optimization techniques to maximally split the flow across paths to thwart an adversary who could be potentially monitoring data packets flowing through any link.

A method is provided according to some embodiments, of sending a flow of a plurality of data packets across a data network from a source node to a destination node, the data network including a plurality of links between nodes. The method includes: (a) determining a set of weights, the weights corresponding to respective links of the plurality of links, such that obeying the set of weights during data transmission tends to minimize side channel leakage for the flow; and (b) routing packets of the flow along the plurality of links of the data network according to their respective weights. A corresponding apparatus, system, and computer program product are also provided.

BRIEF DESCRIPTION OF THE DRAWINGS

The foregoing and other objects, features, and advantages will be apparent from the following description of particular embodiments, as illustrated in the accompanying drawings in which like reference characters refer to the same parts throughout the different views. The drawings are not necessarily to scale, emphasis instead being placed upon illustrating the principles of various embodiments.

FIG. 1 illustrates an example system in accordance with one or more embodiments.

FIG. 3 illustrates an example method in accordance with one or more embodiments.

DETAILED DESCRIPTION

Figure 2:
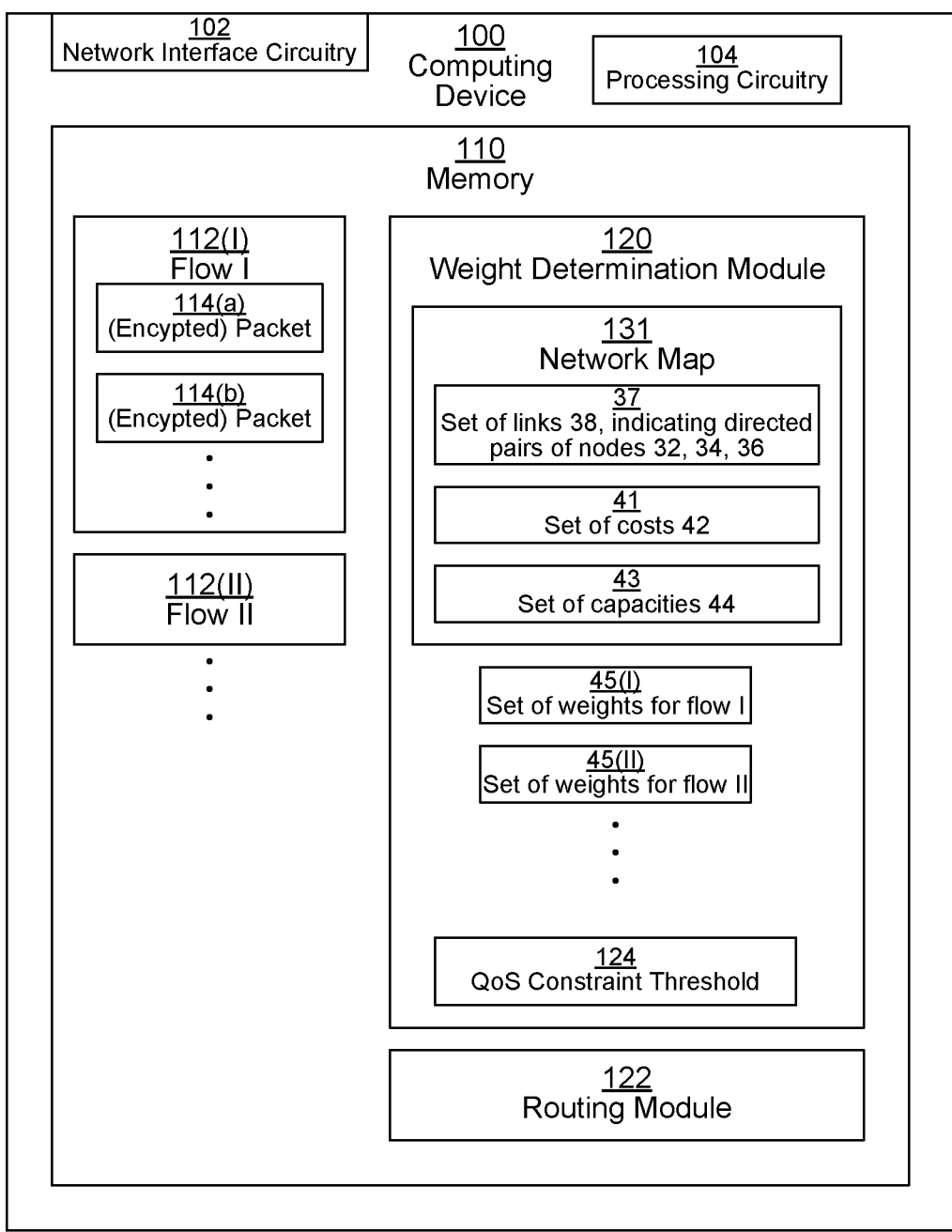
FIG. 2 illustrates an example apparatus and computer program product for use in connection with one or more embodiments.

FIG. 1 depicts an example environment 30 for use in connection with various embodiments. Environment 30 includes a network 31 that connects a source node 32 to a destination node 34 via a plurality of intermediate nodes 36 (depicted as intermediate nodes 36A, 36B, 36C, 36D, 36E, 36F, 36G) and inter-node links 38 (depicted as links 38(1)-38(12)) as well as a set of identified paths 40 (depicted as paths 40-1, 40-2, 40-3, 40-4, 40-5) across the network 31.

Network 31 may be any kind of communications network or set of communications networks, such as, for example, a LAN, WAN, SAN, the Internet, a wireless communication network, a virtual network, a fabric of interconnected switches, etc.

Path 40-1 (also marked ADF) from source node 32 to destination node 34, traverses nodes 36A, 36D, and 36F via links 38(1), 38(4), 38(9), and 38(11). Path 40-2 (also marked BDF) from source node 32 to destination node 34 traverses nodes 36B, 36D, and 36F via links 38(2), 38(5), 38(9), and 38(11). Path 40-3 (also marked BE) from source node 32 to destination node 34 traverses nodes 36B and 36E via links 38(2), 38(6), and 38(10). Path 40-4 (also marked CE) from source node 32 to destination node 34 traverses nodes 36C and 36E via links 38(3), 38(7), and 38(10). Path 40-5 (also marked CG) from source node 32 to destination node 34 traverses nodes 36B and 36E via links 38(3), 38(8), and 38(12).

Other paths 40 across network 31 from source node 32 to destination node 34 are possible (e.g., traversing nodes 36C, 36E, 36B, 36D, and 36F via links 38(3), 38(7), 38(6), 38(5), 38(9), and 38(11)). However, as depicted in FIG. 1, only paths 40-1, 40-2, 40-3, 40-4, 40-5 across the network 31 have been identified as meeting QoS constraints.

According to an embodiment, a flow of packets (not depicted) from the source node 32 to the destination node 34 is stochastically divided between paths 40-1, 40-2, 40-3, 40-4, 40-5.

Network 31 also includes properties depicted in table 39. Table 39 includes a set 37 of links 38 and corresponding sets 41, 43, 45.

Set 41 of costs 42 (depicted as costs 42(1)-42(12)) indicates respective costs 42 for respective links 38. In some example embodiments, a cost 42 may be a time to traverse a link 38 per unit of traffic flow. In other example embodiments, a cost 42 may be a monetary cost to traverse a link 38 per unit of traffic flow. In other example embodiments, a cost 42 may be an amount of energy expended to traverse a link 38 per unit of traffic flow. In other example embodiments, a cost 42 may include a combination of several of the above example costs, all measured per unit of traffic flow.

Set 43 of capacities 44 (depicted as capacities 44(1)-44(12)) indicates respective maximum capacities 44 for respective links 38. In some example embodiments, a capacity 44 may represent a maximum amount of traffic (either simultaneous or not) to traverse a link 38, measured in data per time (e.g., bits per second).

Set 45 of assigned weights 46 (depicted as weights 46(1)-46(12)) indicates respective weights 46 assigned to respective links 38.

FIG. 2 depicts an example computing node 100 for use in connection with various embodiments. Computing node 100 may be any kind of computing device, such as, for example, a personal computer, laptop, workstation, server, enterprise server, tablet, smartphone, router, etc. Computing node 100 may embody a source node 32 in the context of FIG. 1. In some embodiments, an intermediate node 34 may also be embodied by computing node 100.

Computing node 100 includes network interface circuitry 102, processing circuitry 104, and memory 110. Computing device 100 may also include various additional features as is well-known in the art, such as, for example, user interface circuitry, interconnection buses, etc.

Network interface circuitry 102 may include one or more Ethernet cards, cellular modems, Fibre Channel (FC) adapters, InfiniBand adapters, wireless networking adapters (e.g., Wi-Fi), and/or other devices for connecting to a network 31.

Processing circuitry 104 may include any kind of processor or set of processors configured to perform operations, such as, for example, a microprocessor, a multi-core microprocessor, a digital signal processor, a system on a chip (SoC), a collection of electronic circuits, a similar kind of controller, or any combination of the above.

Memory 110 may include any kind of digital system memory, such as, for example, random access memory (RAM). Memory 110 stores an operating system (OS, not depicted, e.g., a Linux, UNIX, Windows, MacOS, or similar operating system) and various drivers and other applications and software modules configured to execute on processing circuitry 104 as well as various data.

Memory 110 stores a weight determination module 120 and a routing module 122, which are configured to execute on the processing circuitry 104 of the computing device 100.

In operation, weight determination module 120 analyzes a network map 131 (including sets 37, 41, 43) of network 31 to determine a set 45 of weights 46 to apply to links 38 of network 31 for a particular flow 112 of packets 114 (depicted as packets 114($a$), 114($b$), . . . ) from a source node 32 to a destination node 34 across the network 31 via intermediate nodes 36 and links 38 according to the network map 131. In some embodiments, path determination module 120 may make reference to a set of constraints in making this determination. For example, path determination module 120 may utilize a QoS constraint 124 limiting the set 45 of weights 46 to ensure that an average cost (e.g., an average path length) does not exceed a threshold value.

In some embodiments, multiple flows 112 (depicted as flows 112(I), 112(II), . . . ) may coexist on network 31. Thus, a separate set 45 of weights 46 (depicted as sets 45(I), 45(II), . . . ) may be assigned for each flow 112. Each flow 112 is defined by a source node 32, destination node 34 pair.

In some embodiments, flows 112 of packets 114 are received via network interface circuitry 102 via another device (not depicted) on the network 31. In other embodiments, flows 112 are generated locally, e.g., by an application (not depicted) executing on processing circuitry 104. In some embodiments, the packets 114 of the flow 112 may all be encrypted, while in other embodiments, some or all of the packets 114 of the flow 112 may be unencrypted.

In some embodiments, weight determination module 120 assigns the weights 46 using a Minimize Maximum Load (MML) strategy to minimize the maximum load at any given node 36. In other embodiments, weight determination module 120 assigns the weights 46 using a Quadratic Spreading Strategy (QSS) using constrained quadratic optimization techniques to optimally split the flow 112 across several paths.

In operation, routing module 122 sends packets 114 of each flow 112 towards the destination node 34 via network interface circuitry 102 with reference to the assigned set 45 of weights 46 for each flow 112.

Memory 110 may also store various other data structures used by the OS, weight determination module 120 routing module 122, and/or various other applications and drivers. In some embodiments, memory 110 may also include a persistent storage portion. Persistent storage portion of memory 110 may be made up of one or more persistent storage devices, such as, for example, magnetic disks, flash drives, solid-state storage drives, or other types of storage drives. Persistent storage portion of memory 110 is configured to store programs and data even while the computing device 100 is powered off. The OS, weight determination module 120 routing module 122, and/or various other applications and drivers are typically stored in this persistent storage portion of memory 110 so that they may be loaded into a system portion of memory 110 upon a system restart or as needed. The OS, weight determination module 120, routing module 122, and/or various other applications and drivers, when stored in non-transitory form either in the volatile or persistent portion of memory 110, each form a computer program product. The processing circuitry 104 running one or more applications thus forms a specialized circuit constructed and arranged to carry out the various processes described herein.

FIG. 2 illustrates an example method 200 performed by a computing device 100 for reducing detectability of a flow 112 of packets 114 across a network 31 by dividing the flow 112 into a plurality of sub-flows. It should be understood that any time a piece of software (e.g., OS, weight determination module 120, routing module 122, etc.) is described as performing a method, process, step, or function, what is meant is that a computing device 100 on which that piece of software is running performs the method, process, step, or function when executing that piece of software on its processing circuitry 104. It should be understood that one or more of the steps or sub-steps of method 200 may be omitted in some embodiments. Similarly, in some embodiments, one or more steps or sub-steps may be combined together or performed in a different order.

Method 200 may be performed at a source node 32 or at an intermediate node 36.

In step 210, weight determination module 120 determines the set 45 of weights 46 for a flow 112, the weights 46 of set 45 corresponding to respective links 38 of set 37, such that obeying the set 45 of weights 46 during data transmission tends to minimize side channel leakage for the flow 112. The sum of all weights 46 of all links 38 going into any intermediate node 36 should always equal the sum of all weights 36 of all links 38 output from that intermediate node 36. In some embodiments, step 210 may include sub-steps 211, 212, 214, 215, 218, and/or 220.

In sub-step 211, weight determination module 120 sets costs 42 corresponding to certain links 38 to a maximum value (e.g., $2^{32}-1$ or $2^{31}-1$ if 32-bit integers are used for the weights). In particular, the links 38 whose associated costs 42 are set to the maximum value may include all untrusted links 38, such as, for example, all links 38 which are suspected of being tapped by an adversary. As another example, all links 38 that input into or are output from any untrusted intermediate node 36 may be set to the maximum value. An untrusted node is an intermediate node 36 which is suspected of being controlled by an adversary or which an adversary has inspectional access to (i.e., a node 36 which runs software under the control of an adversary which allows the adversary to inspect access patterns to processing resources of that node 36). For example, with reference to FIG. 1, if node 36D is untrusted, then links 38(4), 38(5), and 38(9) would have their respective costs 42(4), 42(5), and 42(9) set to the maximum value. It should be understood that although step 211 has been described as setting costs 42 for certain links 38 to a maximum value, in another equivalent embodiment, instead of setting those costs 42 to the maximum value, the links 38 (e.g., links 38(4), 38(5), and 38(9)) themselves could be removed from the network map 131.

In sub-step 212, weight determination module 120 imposes a QoS constraint 124. The QoS constraint 124 serves to ensure that a sum of products of a respective cost 42 of traversing each link 38 with the weight 46 for that link 38 over all links 38 of the network 31 does not exceed the QoS constraint 124. This effectively ensures that the end-to-end performance delivered to the user does not suffer much due to the spreading of the data packets along potentially non-shortest paths.

Figure 4A:
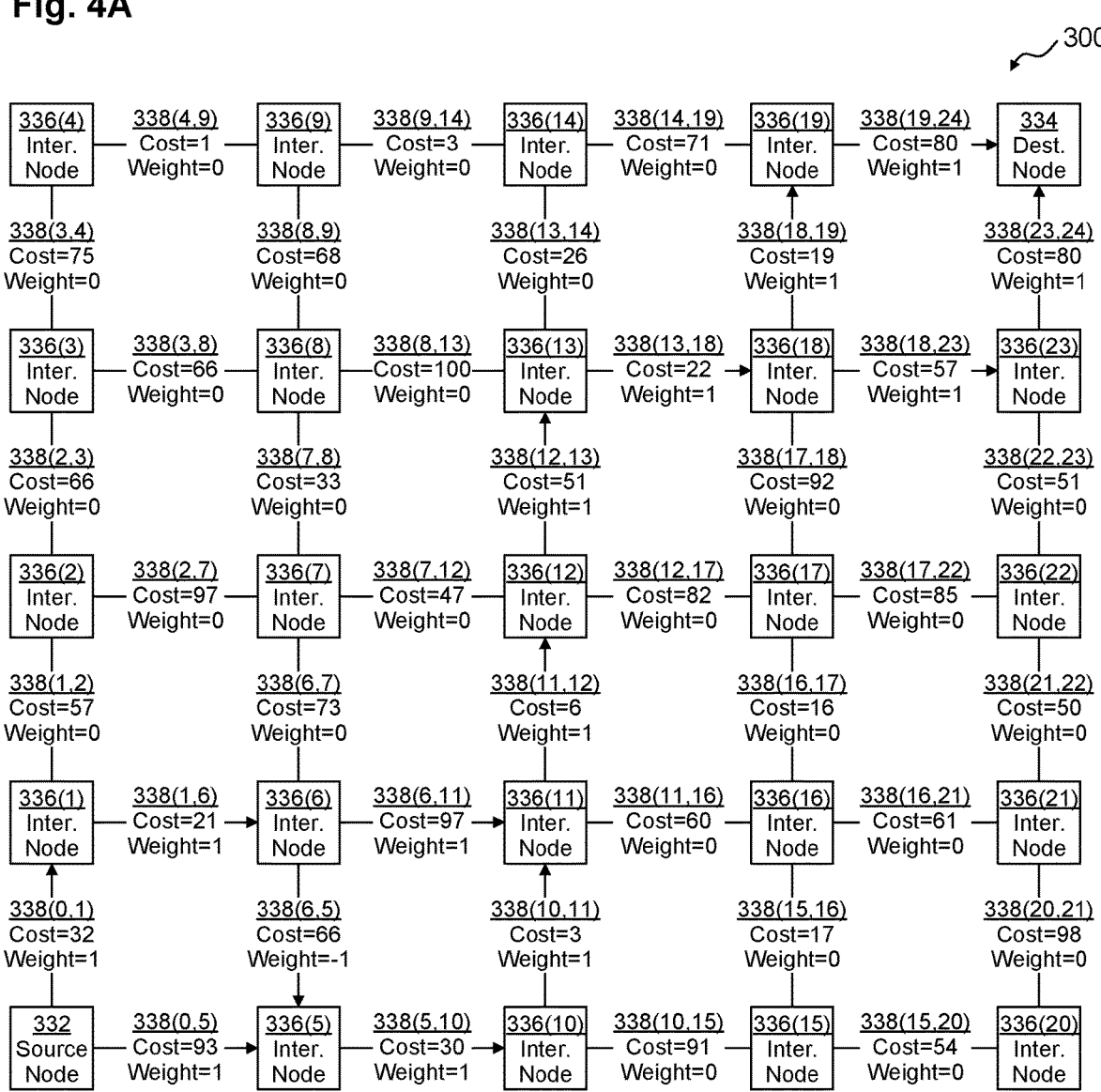
FIGS. 4A-4C illustrate example system configurations according to one or more embodiments.

With reference to FIG. 4A, arrangement 300 depicts an example network 31 having a source node 332, a destination node 334, and 23 intermediate nodes 336 (depicted as intermediate nodes 336(1)-336(23)). Costs 42 across links 338 between the intermediate nodes 336 are depicted. Given a QoS constraint 124 to keep the total cost 42 from the source node 332 to the destination node 336 less than or equal to 342, there are 4 qualified paths 40:

I.   332→336(5)→336(10)→336(11)→336(12)→336 (13)→336(18)→336(19)→334 with total trip length=304

II.  332→336(1)→336(6)→336(11)→336(12)→336 (13)→336(18)→336(19)→334 with total trip length=328

III. 332→336(1)→336(6)→336(5)→336(10)→336 (11)→336(12)→336(13)→336(18)→336(19)→334 with total trip length=330

IV.  332→336(5)→336(10)→336(11)→336(12)→336 (13)→336(18)→336(23)→334 with total trip length=342

Alternatively, instead of performing the QoS calculations on a per-path basis, each link 338 may have its respective weight 46 and cost 42 multiplied, with the products for each link 338 summed together. Since the weights 46 in FIG. 4A are all either zero or one, this calculation is rather easy.

In sub-step 214, weight determination module 120 ensures that each weight 46 of the set of weights 45 does not exceed a maximum capacity 44 of the corresponding link 38. Alternatively, in embodiments in which multiple flows 112 are utilized, in sub-step 215, weight determination module 120 ensures that, for each link 38 of the plurality of links 37, a sum of the weight 46 for that link 38 and any corresponding weights 46 for that link 38 for all other flows 112 does not exceed a maximum capacity 44 of the corresponding link 38.

In sub-step 218, if weight determination module 120 determines that ensuring that the sum of products of the respective cost 42 of traversing each link 38 with the weight 46 for that link 38 over all links 38 of the network 31 does not exceed the QoS constraint 124 is impossible, then weight determination module 120 reduces the costs 42 of one or more links 38 having respective costs 42 set to the maximum value (or previously set to the maximum value) and returns back to sub-step 212, repeating as needed until possible. Equivalently, instead of decreasing the costs 42 for untrusted links 38, in embodiments in which those untrusted links 38 were simply removed from the network map 131 in sub-step

211, those untrusted links 38 may be added back into the network map 131 (but still with relatively high costs 42 in comparison to the other links 38) prior to returning to sub-step 212.

With reference again to FIG. 4A, it should be noted that all of paths I-IV contain nodes 336(11), 336(12), 336(13), and 336(14)—each of these 4 nodes is thus a vertex separator that allows an adversary to access information about the flow 112. If, as in arrangement 300' of FIG. 4B, spreading is used more effectively, then a new qualified path 40 opens up:

V.    332→336(1)→336(6)→336(7)→336(8)→336(9)→
        336(14)→336(19)→334 with total trip length=381

Figure 4B:
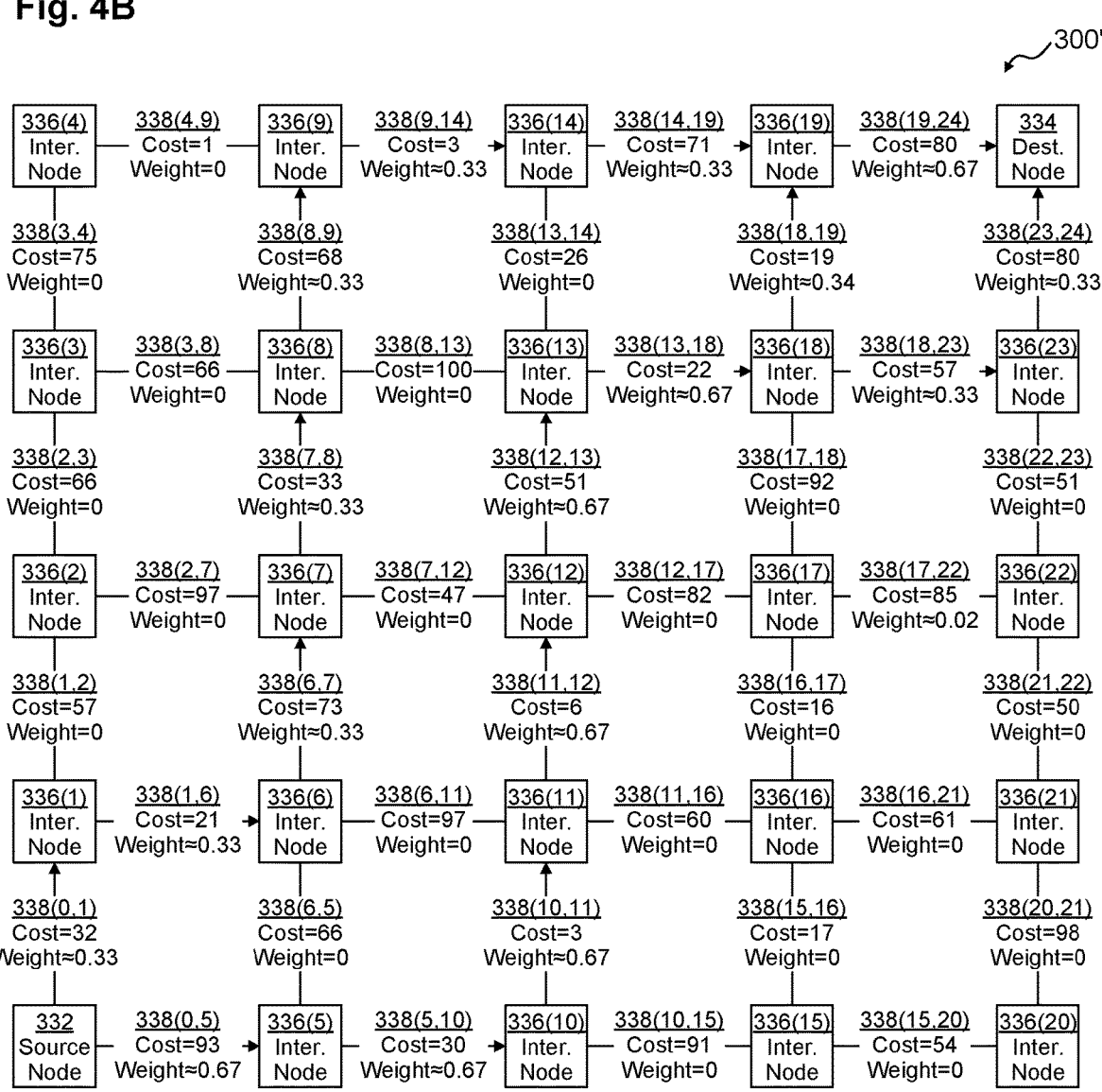

The addition of path V allows the set of paths I-V (or just paths I, IV, V, as depicted in FIG. 4B) to avoid a single weak point.

Thus, in some embodiments, step 210 includes sub-step 220. In sub-step 220, weight determination module 120 utilizes a spreading scheme that spreads traffic across a plurality of diverse paths 40 across the network 31 towards the destination node 34. In some embodiments, sub-step 220 includes sub-step 222, while in other embodiments, sub-step 220 includes sub-step 224.

In sub-step 222, weight determination module 120 minimizes a maximum load (MML) per intermediate node 36 between the source node 32 and the destination node 34. In other words, the sub-flows are allocated such that the maximum total flow entering any intermediate node 36 is minimized—this reduces the maximum rate of side channel leakage due an adversary monitoring the total traffic flow through any intermediate node 36. This mostly splits the traffic over two simultaneous (and mostly disjoint) paths (see FIG. 4B). The MML flow distribution can be solved by a linear program as follows.

We model the network topology as a directed graph G=(V,E) where V is the set of all nodes, E is the set of all directed links (i,j) from node i to node j with i, j∈ V. Denote the incidence matrix of G by the |V|×|E| matrix M. For each directed link (u,v)=e∈ E, we have M[u,e]=−1, M[v,e]=+1. The currently available link capacities and costs (e.g., delay, negative-log-reliability, etc.) are denoted by |E|-dimensional vectors R and b, respectively.

We consider m source-target pairs in the slice, denoted by C={(s₁, (s₂,t₂), . . . , which are commonly referred to as commodities (or applications). We assume that each commodity originates at a source and is consumed by a destination, and that the se's (and similarly tᵢ's) need not be distinct. If node ID pair $(s_i,t_i)$ is the same as $(s_k,t_k)$, they should transport different commodities—in practice, these are distinguished by different application port numbers. As per the slice service-level-agreement (SLA), the offered load at each $s_i$ is $d_i$ units of flow, and the expectation is that for a feasible flow, each target destination t, would receive all $d_i$ units while satisfying the QoS guarantees, e.g., ultralow latency, high reliability, etc. The offered load is denoted by a (|V|×m)-dimensional matrix L={L₁; L₂; . . . ; $L_m$}, where each column vector L corresponds to commodity i, and has the following values: $L_i[s_i]=-d_i$; $L_i[t_i]=+d_i$, and the rest of the entries are 0. Note that $d_i$'s represent aggregate upper bounds on traffic demands for each commodity, which are used for slice provisioning at slow time scales to ensure SLA compliance, and we do not expect to re-plan every time we get a new flow or an existing flow goes away.

Let $q_e^{(c)}$ denote the rate at which information flow from commodity c is transmitted along a directed link e=(i,j) EE; it is expressed compactly by a |E|×|C| matrix Q={q⁽¹⁾, . . . $q^{(c)}$, . . . $q^{(|C|)}$}, where column vector $q^{(c)}$ of dimension |E|×1 denotes the flow rate variables over each link for commodity c. Since the flows are real quantities, they obey non-negativity constraints, denoted by Q≥0. Assuming there is no loss along any link, flow conservation constraints hold at each node in the network except the source and the target. These constraints can be represented in matrix-vector form as MQ=L.

The total flow across the link e is therefore $$q_e = \sum_{c=1}^{|C|} q_e^{(c)}.$$

Since each link has finite capacity or data rate $R_e$, $q_e$ must obey the constraint $$q_e = \sum_{c=1}^{|C|} q_e^{(c)} \leq R_e,$$

or in vector notation:

$$\sum_{c=1}^{|C|} q_e^{(c)} \leq R.$$

Next, let $b_e$ be a constant bounding the cost incurred by sending a unit of information flow over link e∈ E. This is denoted by an |E|-vector b. Key cost measures such as delay and reliability can be generally covered by the additive cost model (reliability can also be covered by taking the negative of its logarithm). The total cost paid by the flow for commodity c is therefore $\gamma^{(c)}=\Sigma_e b_e q_e^{(c)}=b\cdot q^{(c)}=b^T q^{(c)}$ (in standard vector dot product form, where $b^T$ is the transpose of b). Since the costs of different commodities are independent, the total cost for the entire system can be represented by a |C|-vector $b^T Q$ (one element for each commodity). The service level agreement for each commodity can be represented by a |C|-vector s. Therefore, the QoS constraints can be encoded in the vector inequality $b^T Q \leq s$ (when one is trying to minimize the QoS metric).

In order to apply a MML strategy that minimizes the maximum flow into any intermediate node 36, we minimize a linear objective A, which for each commodity is the upper bound on the incoming flow at all intermediate nodes 36. This can be captured by adding |V|−2 linear constraints relating $q^{(c)}$ to Δ as shown in the following linear program:

| | |
|---|---|
| min Δ | subject to the linear constraints: |
| $\forall_{c\in C}: \widetilde{M}_c q^{(c)} \leq \Delta \tilde{1}$ | // node load for each commodity |
| $b^T Q \leq s$ | // individual QoS requirements |
| $\Sigma_{c\in C} q^{(c)} \leq R$ | // capacity constraint for each link |
| MQ = L | // flow conservation constraints |
| Q ≥ 0 | // non-negativity of flow |

Here $\widetilde{M}_c$ is the incidence matrix without the rows corresponding to the source node 32 and the target node 34 for commodity c, and $\tilde{1}$ is a vector of |V|−2 ones.

As illustrated earlier in FIG. 4B, MML-based optimization achieves a good degree of flow spreading. The weights 46 obtained upon applying MML-based optimization to the arrangement 300' are as follows:

[{(0, 5): 0.6695484782267431, (0, 1): 0.3304517599013778, (1, 6): 0.33045170075037583, (5, 10): 0.6695492800851405, (6, 7): 0.33045132763282126, (7, 8): 0.3304529238100605, (8, 9): 0.33045264962898657, (9, 14): 0.3304539853942916, (10, 11): 0.6695508705068998, (11, 12): 0.669550639530127, (12, 13): 0.6695470577681581, (13, 18): 0.6695459672955433, (14, 19): 0.3304556495749239, (18, 23): 0.330397288583681, (18, 19): 0.3391419363740926, (19, 24): 0.6696021852091002, (23, 24): 0.3303972917278047}]

The solution to the above problem tends to split the traffic into smaller flows which are transmitted on a relatively small subset of links along good QoS-compliant routes. This may be sufficient for thwarting an adversary who is allowed to strategically position himself anywhere in the network to see portions of the original data stream. Indeed, our experiments indicate that side channels exposed due to the analysis of packet size and inter-packet interval distributions can be somewhat mitigated by reducing the observability of packet streams. Table 1 illustrates the effect of reduced observability of packets on the ability to classify encrypted packet streams/flows passing through a node into traffic types such as video streaming, file transfer, chat, etc. using machine learning approaches or other methods. If half the packets are not observed, the classification error increases from 26% to 41%. Here we assume that the source stripes its flow across two available paths, that is, every alternate packet in its stream is sent on one of the two paths in an alternating manner. One of the two resultant sub-flows is observed by the adversary. If only a quarter of the packets are observed (say, 1-of-4 striped paths is observed), the error jumps to 51%.

TABLE 1

| Percentage of unobserved packets | 0% | 50% | 67% | 75% | 90% |
|---|---|---|---|---|---|
| Flow classification error | 26% | 41% | 45% | 51% | 65% |

In sub-step 224, weight determination module 120 applies a quadratic spreading strategy (QSS). Thus, with reference to arrangement 300'' of FIG. 4C, QSS is applied using a QoS threshold of 342. Thus, a wide variety of paths 40 are determined in connection with sub-step 224.

Figure 4C:
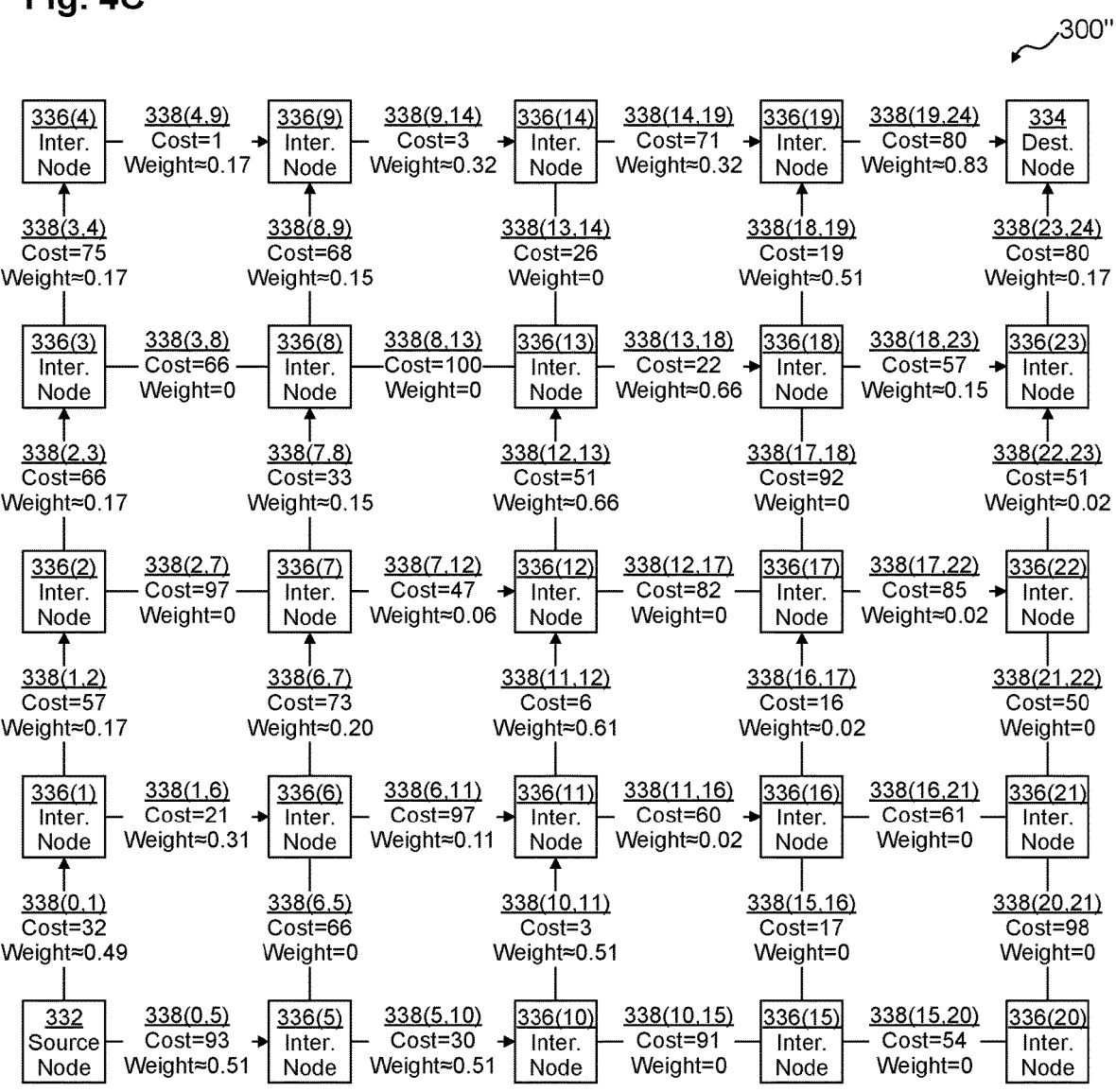

However, in in the QSS approach of FIG. 4C, packets 114 of flow 112 are distributed across various paths 40 such that the average path length is less than or equal to 342, even though many of these paths 40 are longer than that average.

An adversary can be made to work harder if the sub-flows 150 are dispersed even more (than the MML strategy) near the source node 32 and in the intermediate portions of the network 31 before the smaller sub-flows are coalesced into larger subflows near the destination node 34. Hence, instead of minimizing the maximum flow into any intermediate node 36, the Quadratic spreading strategy uses an explicit objective for maximally spreading and recombining the flow using any spatial diversity available in the network 31. In this strategy, while there may be intermediate nodes 36 which see higher loads than in MML (e.g., node 336(19)), they are typically the ones that coalesce packets from upstream sub-flows into a larger flow. Observing each smaller sub-flow does not give an edge-eavesdropping adversary much to work with. Moreover, since the packets 114 in a coalesced flow need not follow the original source's ordering, a node-eavesdropping adversary cannot typically glean more side-channel information from a more voluminous sub-flow. To achieve spreading and still satisfy the QoS constraint s, s should be greater than the minimum value of $b^T Q$ so that sending a flow along paths 40 slightly longer than the shortest paths would not hurt the QoS bound. A quadratic objective function of the amount of various commodities' flows can achieve more aggressive spreading, and thus help further reduce side channel leakage. The quadratic program (QP) shown below attempts to achieve maximum spreading while providing each commodity with its requested QoS (denoted by a ICI-vector s). While similar increasing convex objective functions have been proposed for flow load balancing, our use of such an optimization framework to minimize observability at any node in the network is novel.

| | |
|---|---|
| $\min_Q \Sigma_{c \in C} \lVert q^{(c)} \rVert^2$ | subject to the linear constraints: |
| $b^T Q \leq s$ | // individual QoS requirements |
| $\Sigma_{c \in C} q^{(c)} \leq R$ | // capacity constraint for each link |
| $MQ = L$ | // flow conservation constraints |
| $Q \geq 0$ | // non-negativity of flow |

To understand how the quadratic objective function maximizes spreading, assume that a forwarding node 32, 36 has a unit of flow to transmit and has a choice of two outbound interfaces each with unit capacity. If the forwarder chooses one or the other, the value of the objective function is 1 (either $1^2+0^2$ or $0^2+1^2$ depending on which interface is chosen). However, having the forwarder split the load evenly across two interfaces yields the lowest objective value ½. Similarly, if there are k out-interfaces, the best spreading scheme sends 1/k units of flow on each. Indeed, the quadratic objective function attains its minimum 1/k for the same scheme. Additional nodal constraints for bounding the total flow being processed by a subset of nodes can be easily added to model processing bottlenecks on VMs or capping of flow going into known untrustworthy nodes. Our QP is "convex" since it is linearly constrained and the objective function is positive definite, hence it can be solved in polynomial time (as function of input size). Embodiments may leverage recently proposed fast convex solvers that have open source implementations and can solve QPs with millions of variables and constraints in seconds, and hence would easily be able to keep up with the demands of real-world network slice provisioning.

Note that network spread spectrum does not require substantially greater amounts of network capacity to work correctly. In fact, the results of the optimization can be used to reduce the capacity allocated to each link 38 to only the amount needed to support the split, and in fact may require no more capacity than a single path solution that meets the other constraints.

Our optimization framework can support the case where certain commodities may not necessarily want maximum spreading. This can be achieved by defining an objective function which is a convex combination of the max-spread objective and min-cost objective using an interpolating constant $\beta_c$ that governs how much spreading is desired by commodity c:

$$\min \Sigma_{c \in c} \beta_c \lVert q^{(c)} \rVert^2 + (1-\beta_c) b^T q^{(c)}$$

These techniques yield optimal flow values on each link 38 in the network 31. The weights 46 obtained upon applying QSS to the arrangement 300'' are as follows:

[∈(0, 5): 0.5144451396349401, (0, 1): 0.4855546363055974, (1, 6): 0.3107190959119355, (1, 2): 0.17483560629137596, (2, 3): 0.17483544875355028, (3, 4): 0.17483598154663313, (4, 9): 0.17483985215095119, (5, 10): 0.514445250055482, (6, 11): 0.10743711282913775, (6, 7): 0.20328164645145178, (7, 12):

0.057305364471500427, (7, 8): 0.1459760341561296, (8, 9): 0.1459756607310356, (9, 14): 0.3208169166822376, (10, 11): 0.5144481461551716, (11, 16): 0.01566286931613237, (11, 12): 0.6062200508637154, (12, 13): 0.6635256552712556, (13, 18): 0.6635271509623739, (14, 19): 0.32081054826813094, (16, 17): 0.015662368863416785, (17, 22): 0.015661932492379273, (18, 23): 0.15486442678082055, (18, 19): 0.5086627081266305, (19, 24): 0.8294731301308776, (22, 23): 0.015662072041333932, (23, 24): 0.1705267628673537}]

We use these optimal flow values to derive a set of randomized local (per node 36) forwarding rules for forwarding data traffic on outgoing interfaces so that one can meet the QoS requirements and can achieve low observability by the adversary. These derived rules form the basis of Stochastic Multipath Forwarding.

In step 230, routing module 122 routes packets 114 of the flow 112 along the plurality of links 38 of the network 31 according to their respective weights 46. In some embodiments, step 230 may include sub-step 235. In sub-step 235, at each node 32, 36 of the network 31 except the destination node 34 routing module 122 stochastically routes packets 114 of the flow 112 to respective links 38 emanating from that node 32, 36 in proportion to the respective weights 46 of each link 38 emanating from that node 32, 36. Thus, for example, as depicted in FIG. 4C (with reference to the list of weights 46 using QSS), 10.7437112829913775% (approximated as 0.11 in the figure) of packets 114 of a flow 112 are sent over link 338(6,11) into node 336(11), and 51.44481461551716% (approximated as 0.51 in the figure) of packets 114 of the flow 112 are sent over link 338(10,11) into node 336(11), meaning that node 336(11) receives 62.188525898430935% of the total packets 114 of the flow 112. In addition, 1.566286931613237% (approximated as 0.02 in the figure) of packets 114 of the flow 112 are forwarded over link 338(11,16) towards node 336(16), and 60.62200508637154% (approximated as 0.61 in the figure) of packets 114 of the flow 112 are forwarded over link 338(11,12) towards node 336(12). Note that the sum of the output percentages from node 336(11) equals the sum of the input percentages into node 336(11) (any deviation is due to rounding errors).

Given solutions $$q_{i,j}^{(c)}$$

for the outbound flow components for each commodity c at node i, we can compute the forwarding probability $$p_{i,j}^{(D)}$$

to reach destination D from node i via neighbor j. For clarity, designate the set of commodities c with destination $D^{(c)}=D$ as $c^{(D)}$. The forwarding probability $$p_{i,j}^{(D)}$$

is given by $$p_{i,j}^{(D)} = \frac{\sum_{c \in c^{(D)}} q_{i,j}^{(c)}}{\sum_{c \in c^{(D)}} \sum_{j \in S_i} q_{i,j}^{(c)}},$$

where $S_i$ is the set of node i's neighbors. In simple terms, the forwarding probability $$p_{i,j}^{(D)}$$

at node i is the sum of the outbound flows to reach destination D via neighbor node j divided by the sum of the outbound flows to reach destination D via all neighbor nodes. Note that the sum of the forwarding probabilities across neighbors is 1.

Stochastic multipath forwarding works as follows. Whenever a packet 114 enters forwarding node i for destination D, node i randomly selects the next hop neighbor according to the above forwarding probabilities. If a node keeps track of commodities (note that destinations are part of the definition of commodities), more precise forwarding rules can be used. The probability $$p_{i,j}^{(D)}$$

for forwarding commodity c from node i to neighbor j can be expressed as:

$$p_{i,j}^{(D)} = \frac{q_{i,j}^{(c)}}{\sum_{j \in S_i} q_{i,j}^{(c)}}.$$

RESULTS

Spreading data over multiple paths 40 in the network 31 reduces the likelihood of an eavesdropping adversary being able to characterize a passing data flow 112 with high accuracy. As noted earlier, the distribution of packet inter-arrival times (PIAT) carries significant information about the nature of the application flow, and machine learning methods can be used effectively to classify even encrypted flows from such minimal information. However, the proposed QSS approach spreads the packets 114 over the outgoing links in an induced DAG for each (source,target) pair. We computed the DAG and then the PIAT of sub-flows observed at a key subset of network locations (a sub-flow at a node X is a unified stream of incoming packets from different upstream nodes sorted by their time of arrival at X). On two well-known moderate sized topologies (Abilene and GEANT), even a well-located adversary (e.g., at a high degree node or at an aggregator node near the target) cannot approximate the original PIAT of a voice-over-IP data stream with good accuracy. We also computed the Total Variation Distance (TVD)[1] between the PIAT distributions at various intermediate nodes 36 and the complete stream in both topologies as follows:

[1]Note that TVD=0 means adversary can glean the original PIAT distribution in its entirety, whereas TVD=1 means that it cannot glean anything from the distribution.

Abilene Topology:

I. TVD(Complete stream, Max degree node)=0.5306

II. TVD(Complete stream, Neighbor of src)=0.8837

III. TVD(Complete stream, Neighbor of target)=0.2053

IV. TVD(Complete stream, Random other node)=0.9842

GEANT Topology:

I. TVD(Complete stream, Max degree node)=0.2494

II. TVD(Complete stream, Neighbor of src)=0.4424

III. TVD(Complete stream, Neighbor of target)=0.6215

IV. TVD(Complete stream, Random other node)=0.9919

Thus, it is apparent that there is very little side channel leakage in embodiments using QSS on either Abilene or GEANT topologies, especially at a random intermediate node 36.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "background" or as "conventional," Applicants make no admission that such technique, method, apparatus, or other concept is actually prior art under 35 U.S.C. § 102 or 103, such determination being a legal determination that depends upon many factors, not all of which are known to Applicants at this time.

What is claimed is:

1. A method of sending a flow of a plurality of data packets across a data network from a source node to a destination node, the data network including a plurality of links between nodes, the method comprising:

determining a set of weights associated with minimizing side channel leakage for the flow of the plurality of data packets across the data network from the source node to the destination node, the weights corresponding to respective links of the plurality of links, such that obeying the set of weights during data transmission minimizes the side channel leakage for the flow; and routing packets of the flow along the plurality of links of the data network according to their respective weights.

2. The method of claim 1 wherein determining the set of weights such that obeying the set of weights during data transmission tends to minimize side channel leakage includes utilizing a spreading scheme that spreads traffic across a plurality of diverse paths.

3. The method of claim 2 wherein utilizing the spreading scheme includes minimizing a maximum load per intermediate node of the data network between the source node and the destination node.

4. The method of claim 2 wherein utilizing the spreading scheme includes applying a quadratic spreading strategy to achieve maximal spreading across all outgoing links at each node.

5. The method of claim 1 wherein determining the set of weights includes imposing a Quality of Service (QoS) constraint, including ensuring that a sum of products of a respective cost of traversing each link with the weight for that link over all links of the data network does not exceed the QoS constraint.

6. The method of claim 5 wherein determining the set of weights further includes ensuring that each weight of the set of weights does not exceed a maximum capacity of the corresponding link.

7. The method of claim 6 wherein the method further comprises sending another flow of another plurality of data packets across the data network from another source node to another destination node by:

determining another set of weights, the other weights of the other set of weights corresponding to respective links of the plurality of links, such that obeying the other set of weights during data transmission tends to minimize side channel leakage for the other flow, including ensuring that, for each link of the plurality of links, a sum of the corresponding weight and corresponding other weight does not exceed the maximum capacity of that link; and routing packets of the other flow along the plurality of links of the data network according to their respective other weights.

8. The method of claim 5 wherein determining the set of weights further includes:

for all untrusted links, setting their respective costs to a maximum value; and for all links that input into or output from any untrusted node, setting their respective costs to a maximum value.

9. The method of claim 8 wherein determining the set of weights further includes, in response to determining that ensuring that the sum of products of the respective cost of traversing each link with the weight for that link over all links of the data network does not exceed the QoS constraint is impossible, reducing the costs of one or more links having respective costs set to the maximum value.

10. The method of claim 1 wherein routing packets of the flow along the plurality of links according to their respective weights includes, at each node of the data network except the destination node, stochastically routing packets of the flow to respective links emanating from that node in proportion to the respective weights of each link emanating from that node.

11. The method of claim 1 wherein each of the plurality of data packets of the flow is encrypted.

12. A computer program product comprising a non-transitory computer-readable storage medium storing a set of instructions, which, when executed by processing circuitry of a computing device, causes the computing device to:

send a flow of a plurality of data packets across a data network from a source node to a destination node, the data network including a plurality of links between nodes, by:

determining a set of weights associated with minimizing side channel leakage for the flow of the plurality of data packets across the data network from the source node to the destination node, the weights corresponding to respective links of the plurality of links, such that obeying the set of weights during data transmission minimizes the side channel leakage for the flow; and routing packets of the flow along the plurality of links of the data network according to their respective weights.

13. The computer program product of claim 12 wherein determining the set of weights such that obeying the set of weights during data transmission tends to minimize side channel leakage includes utilizing a spreading scheme that spreads traffic across a plurality of diverse paths.

14. The computer program product of claim 13 wherein utilizing the spreading scheme includes minimizing a maximum load per intermediate node of the data network between the source node and the destination node.

15. The computer program product of claim 13 wherein utilizing the spreading scheme includes applying a quadratic spreading strategy.

16. The computer program product of claim 12 wherein determining the set of weights includes imposing a Quality of Service (QoS) constraint, including ensuring that a sum of products of a respective cost of traversing each link with the weight for that link over all links of the data network does not exceed the QoS constraint.

17. A system comprising:

a plurality of computing nodes, including a source node, a destination node, and a plurality of intermediate nodes; and a network configured to connect the source node to the destination node via links between the plurality of computing nodes;

wherein the source node is configured to determine a set of weights associated with minimizing side channel leakage for a flow of a plurality of data packets across the network to the destination node, the weights corresponding to respective links of the plurality of links, such that obeying the set of weights during data transmission minimizes the side channel leakage for the flow; and wherein the source node and the plurality of intermediate nodes are configured to route packets of the flow along the plurality of links of the network according to their respective weights.

18. The system of claim 17 wherein determining the set of weights such that obeying the set of weights during data transmission tends to minimize side channel leakage includes utilizing a spreading scheme that spreads traffic across a plurality of diverse paths.

19. The system of claim 17 wherein determining the set of weights includes imposing a Quality of Service (QoS) constraint, including ensuring that a sum of products of a respective cost of traversing each link with the weight for that link over all links of the data network does not exceed the QoS constraint.

20. The system of claim 17 wherein routing packets of the flow along the plurality of links according to their respective weights by a node includes stochastically routing packets of the flow to respective links emanating from that node in proportion to the respective weights of each link emanating from that node.

* * * * *